(12) United States Patent
Queeno

(10) Patent No.: US 7,228,011 B1
(45) Date of Patent: Jun. 5, 2007

(54) SYSTEM AND METHOD FOR ISSUING A SECURITY UNIT AFTER DETERMINING ELIGIBILITY BY IMAGE RECOGNITION

(75) Inventor: Cameron Queeno, Westminster, MA (US)

(73) Assignee: L-I Identity Solutions, Inc., Stamford, CT (US)

( * ) Notice: Subject to any disclaimer, the term of this patent is extended or adjusted under 35 U.S.C. 154(b) by 627 days.

(21) Appl. No.: 10/377,160

(22) Filed: Feb. 28, 2003

(51) Int. Cl.
G06K 9/54 (2006.01)
H04K 1/00 (2006.01)
G06K 9/00 (2006.01)

(52) U.S. Cl. ............... 382/305; 382/115; 382/181; 713/182

(58) Field of Classification Search ............ 382/110, 382/115, 117, 118, 144, 149, 151, 159, 171, 382/172, 209, 216, 217, 218, 305; 713/182, 713/184, 185, 186
See application file for complete search history.

(56) References Cited

U.S. PATENT DOCUMENTS

| 6,724,919 | B1 * | 4/2004 | Akiyama et al. | 382/118 |
| 2003/0115490 | A1 * | 6/2003 | Russo et al. | 713/202 |
| 2003/0190076 | A1 * | 10/2003 | DeLean | 382/209 |
| 2004/0234109 | A1 * | 11/2004 | Lemelson et al. | 382/118 |
| 2006/0002607 | A1 * | 1/2006 | Boncyk et al. | 382/165 |

* cited by examiner

*Primary Examiner*—Yon J. Couso
(74) *Attorney, Agent, or Firm*—Lahive & Cockfiled, LLP; Anthony A. Laurentano, Esq.; David R. Burns, Esq.

(57) ABSTRACT

Methods and systems for issuing a security unit to an individual, after determining the eligibility of the individual by image recognition, are disclosed. The security unit, such as a security pass or a key, can be issued to the individual by an issuing module after the individual has been recognized by a recognition system, provided various eligibility criteria are met.

21 Claims, 5 Drawing Sheets

SYSTEM AND METHOD FOR ISSUING A SECURITY UNIT AFTER DETERMINING ELIGIBILITY BY IMAGE RECOGNITION

TECHNICAL FIELD

The present invention relates generally to systems that issue security units, and specifically relates to systems that issue such units to individuals after they are shown to be eligible.

BACKGROUND OF THE INVENTION

Systems exist that issue security units to individuals. For example, printers can print a security pass in the form of a card, to which might be affixed a photograph of the individual to whom the card is issued. Such a photo ID is commonplace in our society, and includes a driver's license, a birth certificate, a building pass to access a floor in a building, and the like. As used herein, a security unit is any object that is issued to an individual only if the individual meets some eligibility requirements, and that can grant the individual some special privilege. Examples of security units, besides the photo IDs just mentioned, include credit cards, passports, keys, and visas, to name but a few.

It is important that security units only be issued to persons who are truly eligible to receive them. Failure to correctly ascertain eligibility could have dire consequences. For example, if a terrorist unlawfully obtains a security pass to a secured facility by misrepresentation, the resultant security breach could be catastrophic.

Present methods to determine eligibility have their drawbacks. For example, one common method to determine eligibility for a security unit, such as a passport, involves the presentation of another previous security unit, such as a birth certificate. However, there is no guarantee that the previous security unit was obtained lawfully in the first place. Alternatively, a signature might be required to authenticate the identity of an individual before the individual receives a security unit. Unfortunately, a criminal can forge the signature and obtain the security unit fraudulently. Other methods for determining eligibility for a security unit also have their shortcomings.

There therefore exists a need for systems and methods that issue security units to individuals that are better able to determine correctly the eligibility of the individuals seeking the units.

SUMMARY OF THE INVENTION

In light of the limitations of conventional systems that issue security units, the present invention utilizes image recognition to determine the eligibility, or authenticity, of an individual seeking such a unit.

In particular, a method for issuing a security unit to an individual after determining the eligibility of the individual by image recognition is described herein. The method includes providing an image of the individual. The image can be provided by an image acquisition device, such as a camera, or video recorder. The method also includes finding a match between a representation of the image and a reference in a database, the reference being associated with a reference individual. The method further includes issuing a security unit to the individual provided the reference individual is eligible to receive the security unit.

The types of eligibility criteria that are considered by the method can include determining whether the name of the individual does not match a name of the reference individual in the database. If there is no match, this indicates that the individual may be seeking to obtain a security unit for another person.

Another possible criterion considered by the method can include determining whether the individual has previously received a previous security unit. If the individual has obtained a previous security unit, this may indicate that the individual may be seeking another unit for unlawful purposes.

Finally, a third criterion that could be used involves determining whether the reference individual is allowed to receive the security unit. For example, the individual could be flagged as a wanted fugitive in the database, which would preclude the issuing the security unit.

Also described herein, is a system for issuing a security unit to an individual after determining eligibility by image recognition. The system includes a recognition system for finding a match between a representation of an image of the individual and a reference in a database, the reference being associated with a reference individual. The system further includes an issuing module for issuing a security unit to the individual provided the reference individual is eligible to receive the security unit.

DETAILED DESCRIPTION OF THE INVENTION

Figure 1:
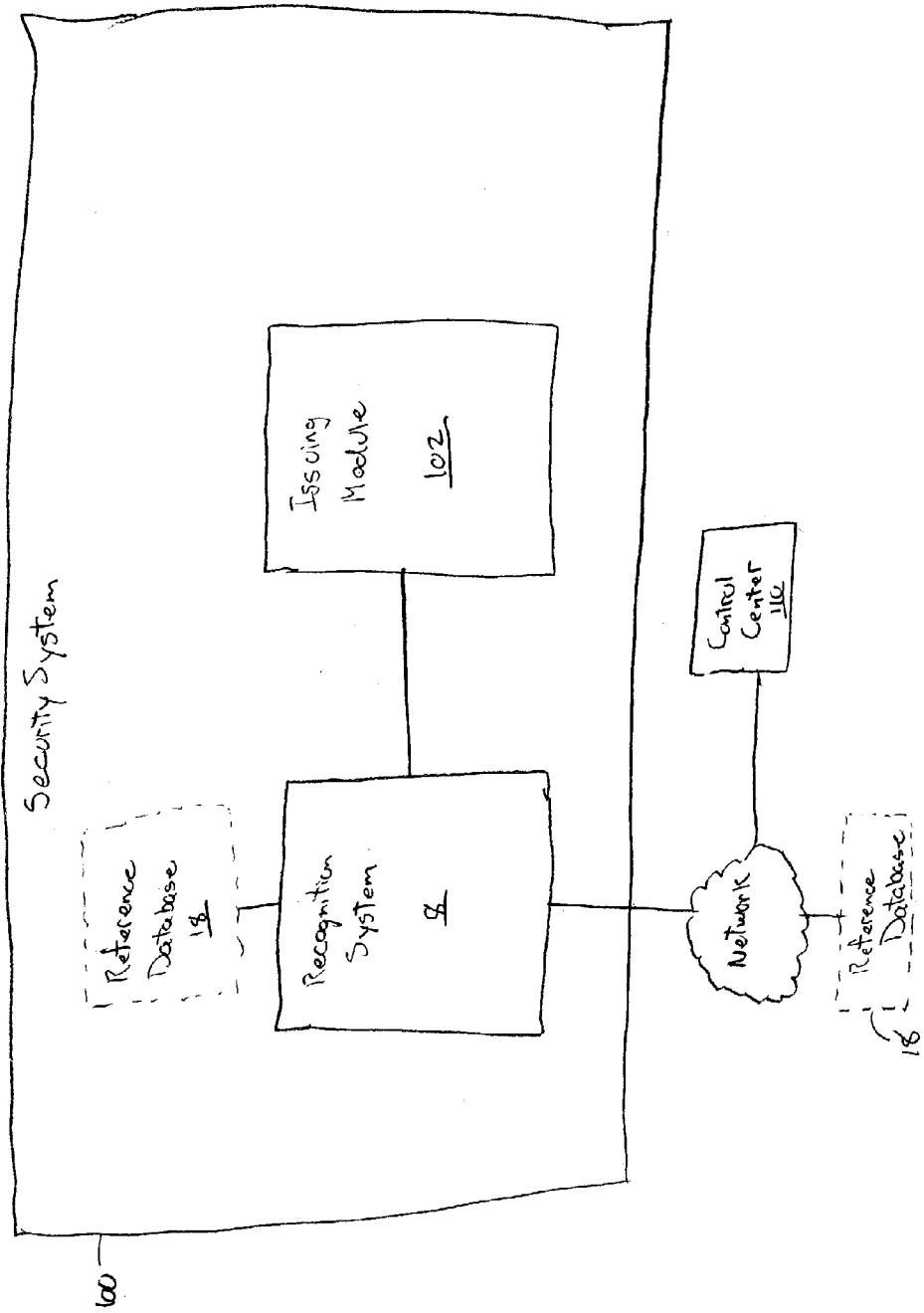
FIG. 1 shows a security system for issuing a security unit to an individual, according to the teachings of the present invention.

FIGS. 1 through 5, wherein like parts are designated by like reference numerals throughout, illustrate an example embodiment of a system and method suitable for issuing security units. Although the present invention is described with reference to the example embodiments illustrated in the figures, it should be understood that many alternative forms could embody the present invention. One of ordinary skill in the art will additionally appreciate different ways to alter the parameters of the embodiments disclosed, such as the size, language, interface, or type of elements or materials utilized, in a manner still in keeping with the spirit and scope of the present invention.

Referring to FIG. 1, a security system 100 for issuing a security unit to an individual, after determining the eligibility of the individual by image recognition, is shown. The security unit can include a key to open a facility, or a photo identification card, which has the photo of the individual on it. Many other examples of security units are possible, characterized only by the fact that an individual wishing to receive the unit must meet some type of eligibility requirement, and that the security unit affords the individual some special privilege, such as access to a facility. The security system includes a recognition system 8, and an issuing module 102.

Figure 3:
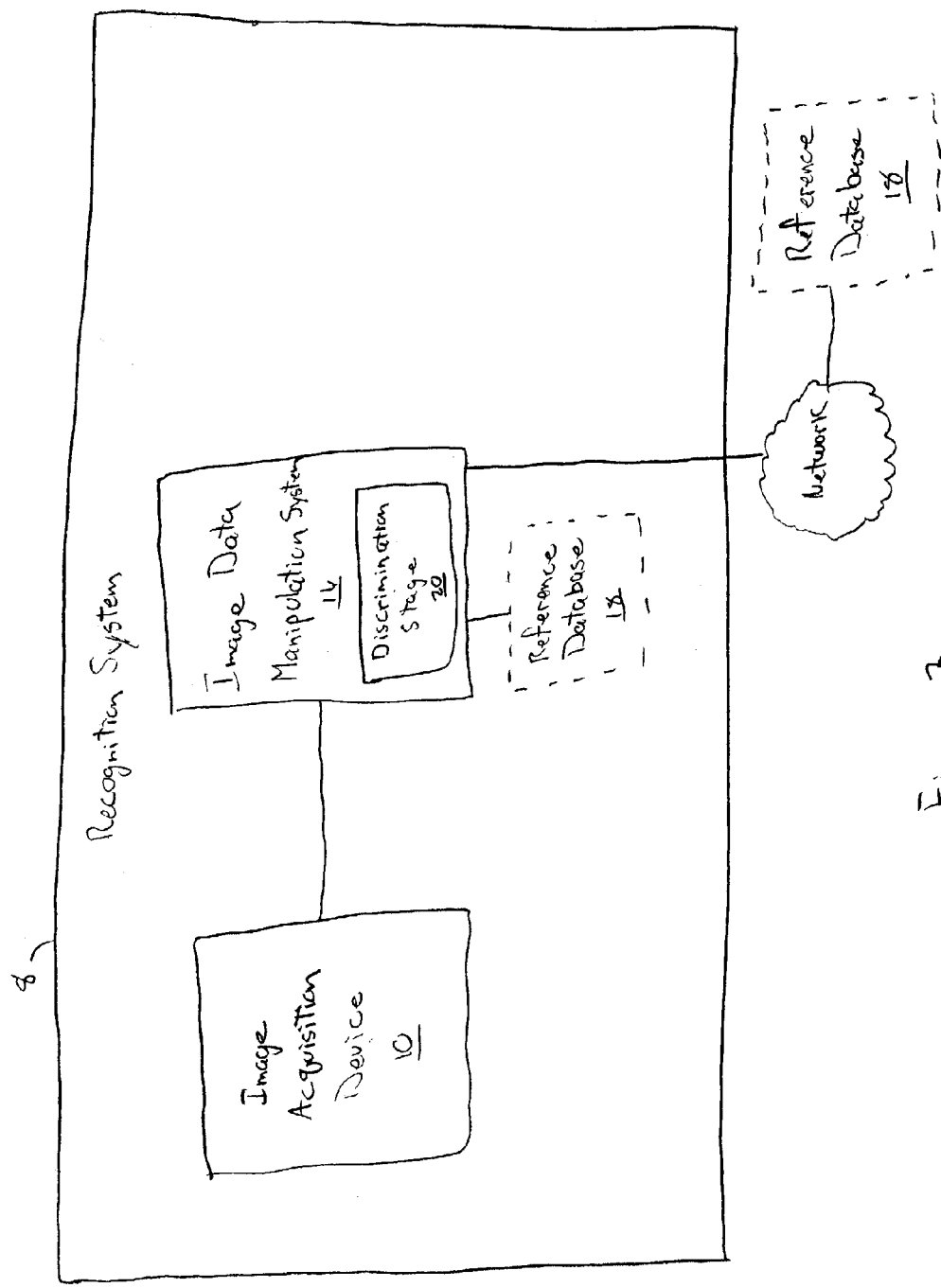
FIG. 3 shows the recognition system of FIG. 1, according to the teachings of the present invention.

The recognition system 8 is used for finding a match between a representation of an image of the individual and a reference in a reference database 18, shown in FIG. 3. As described in more detail below, the representation of the image can be obtained from a column vector $\Gamma$ belonging to a vector space V of dimension N×R, the vector having components corresponding to the intensity of the N×R pixels comprising the image. The representation can be obtained by projecting this vector, or this vector minus an average vector, $\Gamma-\Psi$, onto a subspace W of the vector space to obtain the vector $P(\Gamma-\Psi)$, where P is a projector. The subspace is a span of "principal components," vectors pointing in the directions corresponding to the greatest variation in images between individuals. This approach for identifying an individual, involving Principal Component Analysis (PCA), is set forth in U.S. Pat. No. 5,164,992, the contents of which are hereby incorporated by reference.

The reference database 18 can include a collection of reference vectors belonging to the subspace. The references in the database 18 can come from various sources, such as federal agencies, or commercial vendors. The database 18 can be periodically updated, as new references become available. To update the database 18, an image of an individual with the name of the individual, and/or other identifier, such as a social security number, can be supplied to the recognition system 8. Before being stored in the database 18, the image is pre-processed. Pre-processing might include identifying, centering, rotating, and cropping out the part of the human body to be analyzed, such as a face. The resultant image is then transformed to an appropriate representation. For example, if PCA is used to identify the individual, then the resultant image is first converted to a vector $\Gamma_{ref}$ belonging to V. Next, the representation can be obtained by projecting $\Gamma_{ref}-\Psi$ onto W to yield the vector $P(\Gamma_{ref}-\Psi)$, which can be expressed in a particular representation $[P(\Gamma_{ref}-\Psi)]$, using some basis.

The vector $\Psi \in V$ and the projector P: V→V are obtained from a training set of images or vectors corresponding to images of many individuals. The vector $\Psi$ is the average of the training set vectors. How to obtain the projector P, and the subspace W is explained below. The training set used to obtain P and $\Psi$ can, but need not, correspond to the set of vectors in the reference database 18.

The vector $[P(\Gamma_{ref}-\Psi)]$ can be computed and pre-stored in the database 18. In particular, the representations that are the references in the database need not be computed when an individual is being identified. Instead, during the recognition, the image of the individual being identified is converted to a vector, and then projected; these two operations are not performed on the reference image during operation, but are performed earlier, and the projected reference vector, $[P(\Gamma_{ref}-\Psi)]$, stored. By not having to project the reference vectors during run-time, the time needed for recognition can be reduced significantly.

Instead of providing images, the federal agencies and/or commercial vendors supplying information to update the reference database 18 can provide the projected vectors, $[P(\Gamma_{ref}-\Psi)]$, directly. To be able to do this, the agencies and/or vendors can obtain the projector P and $\Psi$ from the operators of the reference database 18 and from these can calculate $[P(\Gamma_{ref}-\Psi)]$. This approach can be used if the reference database 18 does not coincide with the training set.

Even if the reference database 18 coincides with the training set, the agencies/vendors can supply $[P(\Gamma_{ref}-\Psi)]$ directly using one of two methods. In the first method, applicable when the number of references being supplied by the agencies and/or vendors for updating is much smaller than the number of references in the database 18, the agencies and/or vendors are given the projector P and the average $\Psi$ from the operator. They can then use P and $\Psi$ to calculate $[P(\Gamma_{ref}-\Psi)]$. The second method is applicable when the number of references being supplied by the agencies and/or vendors for updating is not much smaller than the number of references in the database 18. In this case, because P and $\Psi$ properly depend on both the old vectors and the new vectors being supplied, P and $\Psi$ should be recalculated using the new images (i.e., the images added to update) and old images. In the latter case, such a recalculation is probably best done by the operator of the database, since if the agencies and/or vendors perform this recalculation, they would have to be privy to all of the images associated with the references in the database 18.

The reference database contains at least one reference, $\Omega_{ref}=[P(\Gamma_{ref}-\Psi)]$, each of which is associated with a reference individual. In addition, the database can contain a name, and/or another identifier, such as a social security number, which is associated with each reference individual. The matching can be performed by finding the norm $\|\Omega-\Omega_{ref}\|$, where $\Omega=[P(\Gamma-\Psi)]$ and $\Gamma$ is the image vector of the individual seeking a security unit. A match between the individual seeking the unit and the reference individual is deemed to have occurred if $\|\Omega-\Omega_{ref}\|$ is smaller than a configurable threshold, $\epsilon$.

The value of the threshold is determined by the needs of the recognition system 8. If $\epsilon$ too small, fewer matches may occur that could result in many false negative identifications, where a match between $\Omega$ and $\Omega_{ref}$ does not occur even though the individual represented by $\Omega$ and the reference individual represented by $\Omega_{ref}$ are the same. On the other hand, if $\epsilon$ too large, more matches may occur that could result in many false positive identifications, where a match between $\Omega$ and $\Omega_{ref}$ occurs even though the individual represented by $\Omega$ and the reference individual represented by $\Omega_{ref}$ are different people. False positives have the potential of causing inconvenience to those denied a security unit despite being eligible, and embarrassment to the operators of the security system 100. If the goal of the security system is to make sure that no ineligible person receives a security unit, then a large $\epsilon$ in order. On the other hand, if the policy governing the use of the security system 100 is to not inconvenience anyone needlessly by not issuing a security card to an eligible person, then a small $\epsilon$ is warranted.

The issuing module 102 is used for issuing a security unit to the individual provided the reference individual is eligible to receive the security unit. The issuing module 102 can include any of several types of systems that can fabricate a security unit. For example, if the security unit is a card, the issuing module 102 can include a printer to print the card. If the security unit is a key, the issuing module 102 can include a key cutter for cutting a key. The issuing module can also include software and hardware that allows the security system 100 to determine if the individual seeking the security unit is eligible to receive the unit.

Figure 2:
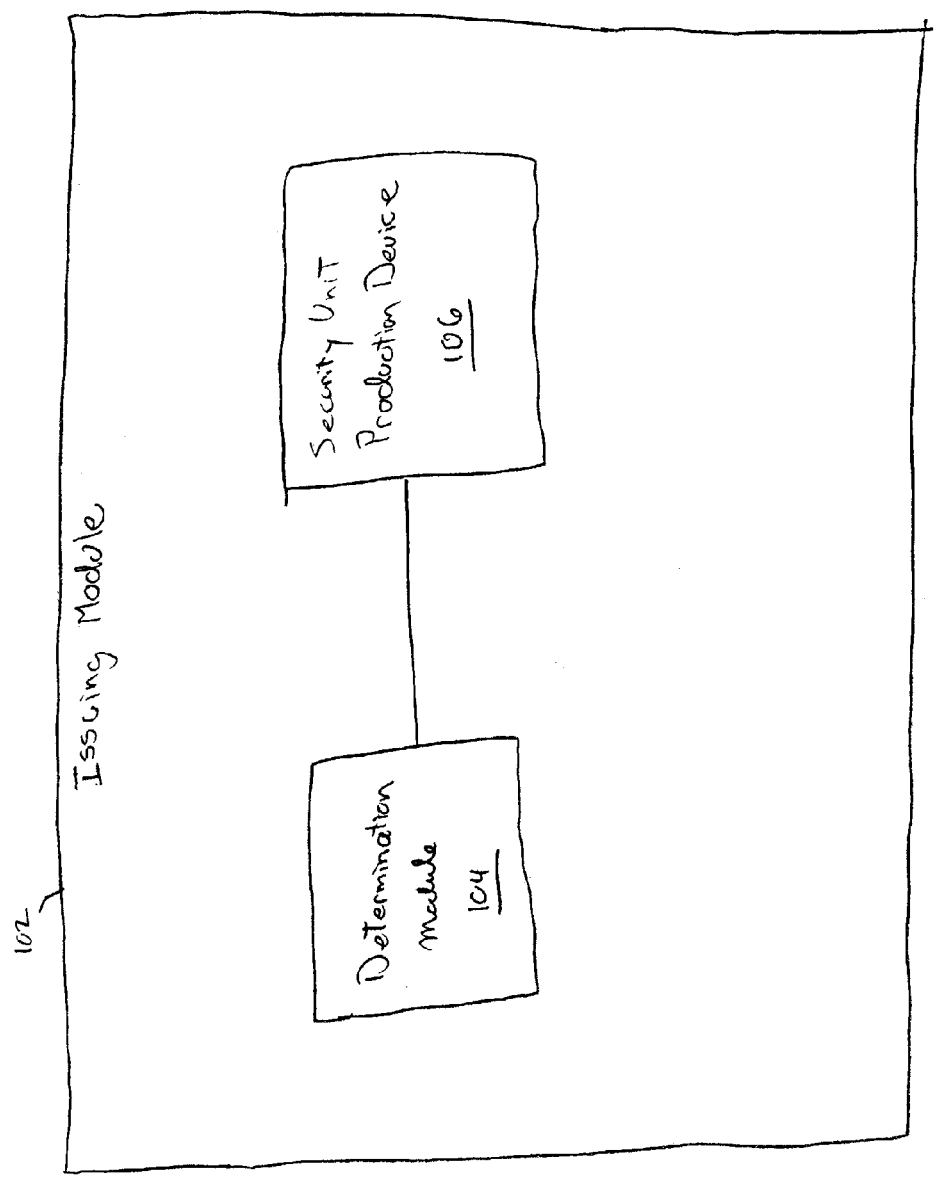
FIG. 2 shows the issuing module of FIG. 1, according to the teachings of the present invention.

Referring to FIG. 2, more details of the issuing module 102 present in FIG. 1 are shown. The issuing module 102 includes a determination module 104, and a security unit production device 106.

The determination module 104 determines if the individual wishing to receive the security unit is eligible to receive the unit. Several criteria could be used to determine eligibility. For example, the determination module 104 could store a list of names of persons that for one reason or another are not eligible to receive a security unit. Thus, if the individual is a convicted felon, the individual may be denied security clearance, and therefore a security unit in the form of a security pass, at a government facility. Another possible criterion to determine eligibility involves the name of the individual seeking a security unit. The references in the reference database 18 are associated with names of individuals. In one embodiment, the individual seeking a security unit has to supply his or her name to the security system 100. The determination module 104 then matches the face of the individual to a face in the reference database 18, and determines if the name supplied is the same as that of the reference individual matched. If these names are different, the individual may be denied a security unit. Still another criterion that the determination module 104 could use to determine if the individual seeking a security unit is eligible to receive the unit is whether the security unit has already been issued to the individual. Thus, when a security unit is issued to an individual, a record is stored that indicates that the individual has already received the security unit. If this same individual attempts to obtain another security unit, the individual may be denied a subsequent security unit.

To summarize, the determination module 104 can use several criteria to determine whether an individual is eligible to receive a security unit. Criteria can include whether i) the reference individual is allowed to receive the security unit, ii) the name of the individual does not match a name of the reference individual, iii) the individual has previously received a previous security unit.

If the determination module 104 makes affirmative determinations of any of the preceding three criteria, several actions can be taken by the security system 100. If the individual seeking to receive the security unit is not allowed to receive a security unit because, for example, the individual is a wanted fugitive, the security system could notify selected personnel of this information. The security system 100 can be connected, via a computer network, such as the Internet, to one or more local or remote sites such as, a control center 110 or other like facility. The security system 100 can include software and/or hardware to send the results of the determinations found by the determination module 104 to these sites. The selected personnel notified can include, for example, local police, or federal agents of security agencies.

The security unit production device 106 is used for producing a security unit for the individual provided the determination module 104 determines that the individual is eligible to receive the unit. The security unit production device 106 can include various types of systems, depending on the particular security unit being issued. For example, if the security unit is a card, such as one that an individual can use to gain access to a secure facility, then the security unit production device 106 can include a card printer for printing and producing the card. In another example, if the security unit is a key, then the security unit production device 106 can include an automatic key maker, as set forth, for example in U.S. Pat. No. 6,065,911. An automatic key maker uses a microprocessor to identify an object key by automatically extracting characteristics thereof. The position and alignment of the object key is automatically determined, the key characteristics are extracted and compared with known key manufacturers' information stored in memory, and an appropriate key blank is identified, cut and dispensed.

Referring to FIG. 3, a recognition system 8 is shown for recognizing individuals seeking to obtain a security unit. The recognition system can include an image acquisition device 10 to obtain image data of an individual to be recognized before the issuance of the security unit. The image acquisition device 10 can include any sensor or apparatus that can obtain an image of a person, such as by capturing, scanning, retrieving, or receiving the image. In one embodiment, the image acquisition device 1l can include a camera, such as a digital camera, for photographing or taping the individual at a selected location. In another embodiment, an image acquisition device 10 can include a database retriever, such as a computer, for retrieving stored images from databases, or computers. Other examples of suitable devices include CCD cameras, video cameras, and scanners. The image acquisition device 10 can be operated at the same location where the issuing module 102 is located. Alternatively, the image acquisition device 10 can be operated remotely.

The recognition system 8 also includes an image data manipulation system 16 for manipulating image data and the reference database 18 that contains representations of reference individuals, and can contain associated names, social security numbers, or other identifiers of the reference individuals. The reference database 18 can include images corresponding to different individuals, and varied images (corresponding to different poses, lighting, etc.) of the same individual. A representation of an image in the database can be denoted by $$\Omega_i^j,$$

the ith image of individual j. The discrimination stage 20 includes software and hardware for distinguishing the individual using the image obtained by the acquisition device 10. Distinguishing an individual includes both positively identifying an individual, as well as excluding an individual by determining that there is no match between an image and reference images in the reference database 18.

Figure 4:
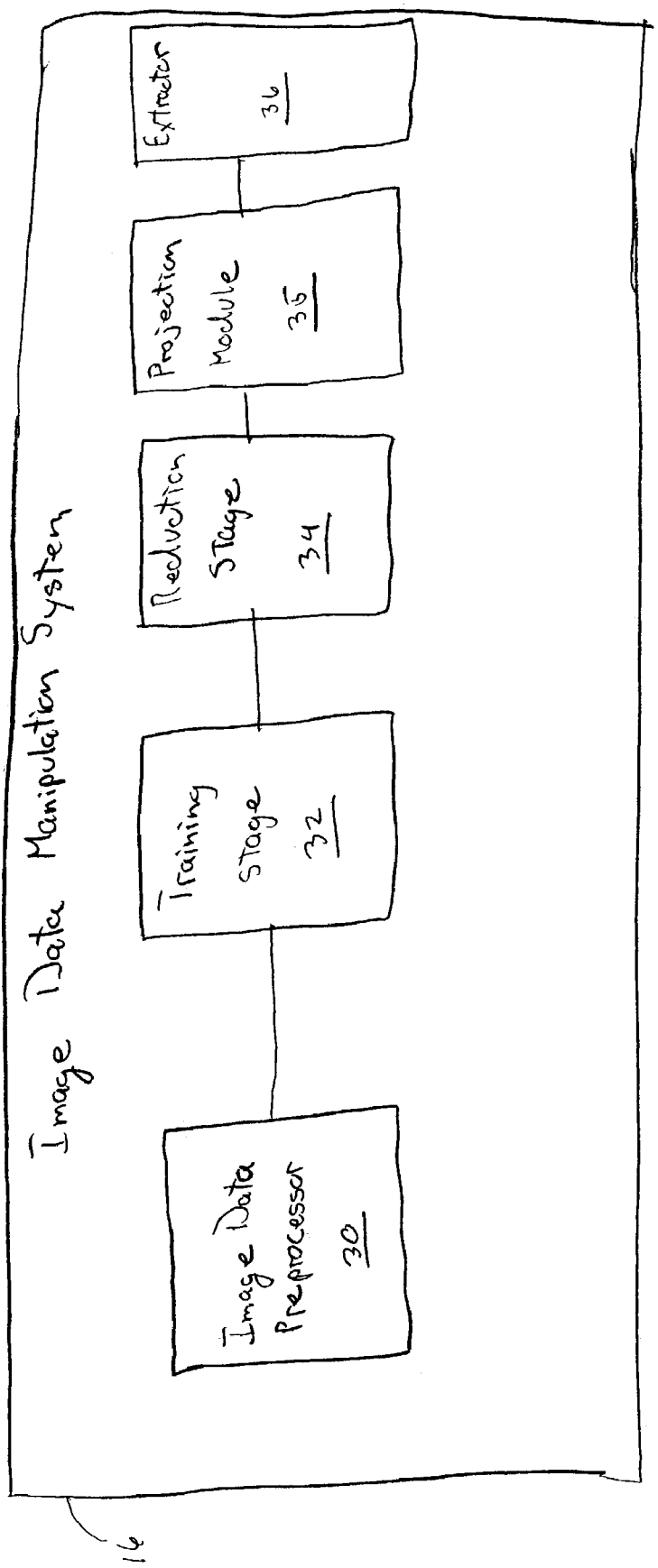
FIG. 4 shows the image data manipulation system of FIG. 3, according to the teachings of the present invention.

Image Data Manipulation System:

Referring to FIG. 4, the image data manipulation system 16 of FIG. 3 is shown in more detail. The image data manipulation system 16 includes hardware and software to form and manipulate image data, and in particular includes an image data preprocessor 30, a training stage 32, a reduction stage 34, a projection module 35, and an extractor 36.

The image data preprocessor 30 obtains and/or prepares image data corresponding to the image acquired by the image acquisition device 10. For example, if the image acquisition device 10 is a digital camera, the image is converted to digital image data by the device 10. The image data preprocessor 30 may then obtain these image data and, if necessary, process them further, as described below. If, on the other hand, the image acquisition device 10 does not produce suitable image data, the image data preprocessor 30 may convert the image to suitable image data by, for example, digitizing it. In addition, the image data preprocessor 30 can process images from the reference database 18 to prepare appropriate image data corresponding to those images. For example, if the reference database 18 of images includes photographs, the image data preprocessor can include a scanner for scanning the photographs and producing digitized representations of the photographs. In some embodiments, the image data are processed as much as possible before the image acquisition device 10 acquires the image of the individual seeking the security unit. In so doing, run-time can be saved when that individual seeks the security unit.

The image data preprocessor 30 can collect the acquired image, and, if necessary, can convert the acquired image into suitable image data, such as digital luminance values, chrominance values, grey scale, and other data associated with, defining, or characterizing an image. For example, the corresponding gray scale image can be used for distinguishing the individual by ascribing a particular intensity to pixels corresponding to locations within the image.

The image data preprocessor 30 can standardize the contrast and brightness of the image to be matched. It has been recognized that the contrast and brightness of the image to be matched may differ significantly from those in the reference database. These differences may skew the matching results, and thus create errors in detection. The image data preprocessor can compensate for differences in contrast and brightness. Specifically, the image to be matched is adjusted relative to each image from the reference database before correlation is performed. The statistical mean and standard deviation of all the pixel values for the individual reference image are determined, and the pixel value of the image to be matched are adjusted according to:

$$I_S(x_i, y_j) = cI(x_i, y_j) + b,$$

where $$c = \Delta I_R / \Delta I$$

$$b = \langle I_R \rangle - \langle I \rangle \frac{\Delta I_R}{\Delta I}$$

and $I(x_i, y_j)$ are the original pixel values in the image to be matched. In these last two equations, $\Delta I$ is the standard deviation of the pixel values of the image to be matched (the unknown image), $\Delta I_R$ is the standard deviation of the reference pixel values of the reference image being compared to the unknown image, $\langle I \rangle$ is the average value of the unknown pixel values, and $\langle I \rangle_R$ is the average value of the reference pixel values. In one embodiment, the reference images are all standardized to have $\Delta I_R = $ (No. Pix.)$^{-1/2}$, where "No. Pix." is the number of pixels in the reference image, and $\langle I_R \rangle = 0$. In addition, the image may be scaled to a standard size based on the location of the eyes, for example. A mask is applied and the active pixels within the masked region may be utilized to form an image vector whose pixel average and standard deviation can be adjusted as described above.

The training stage 32 inputs the training set of image vectors. Ideally, this set contains a wide representation of faces from a population large enough to include many of the individuals seeking a security unit. The training set 32 can, but need not, coincide with the reference database 18. The training stage calculates an average vector, $\Psi \in V$, of the training set. The average image is later used to compute a variance matrix used for further analysis, as described below.

The reduction stage 34 finds M meaningful eigenvectors that span a face space of dimension $M < N^2$, where the image to be analyzed is assumed to be $N \times N$ pixels in size, i.e., for simplicity, R is taken to be N, which corresponds to a square image. It will be understood by those of ordinary skill in the art that although a square image is used herein for illustrative purposes, a more general rectangular image, having $N \times R$ pixels, can be used with appropriate trivial changes in the formalism that follows. Because the dimension of the face space, M, is less than the dimension of the image vector space, $N \times N$, a faster and cheaper analysis of the data is possible.

The projection module 35 takes an image vector, $\Gamma$, and projects $\Gamma - \Psi$ onto the vector subspace of reduced dimension, the face space.

The extractor 36 utilizes information obtained from the projection module 35 and from a plurality of images representing the object to account for intra-object variation in the image arising from, for example, variation in pose, illumination, or expression.

Image Data Pre-Processor: The image data pre-processor 30 forms image data corresponding to an image of a person who seeks a security unit, and can also form reference images from the reference database 18. The image data pre-processor 30 represents the image by a function $I(x_i, y_i)$ giving the intensity, expressed as an 8-bit number for example, at the pixel location $(x_i, y_i)$. If the number of horizontal and vertical pixels is N, then the function $I(x_i, y_j)$ can be represented by an $N \times N$ matrix whose components are the intensity values. The image data pre-processor 30 represents this $N \times N$ matrix as a vector in an $N^2$-dimensional vector space. For example, if $a_{ij}$ is the intensity at the pixel located at $x_i, y_j$ then the matrix can be represented by the column image vector $(a_{11}, \ldots, a_{1N}, a_{21}, \ldots, a_{NN})^T$. Thus, a typical image of size 256 by 256 pixels can be represented by an image vector of dimension 65,536, or, equivalently, a point in 65,536-dimensional image space. An ensemble of images, then, maps to a collection of points in this image space.

Training Stage: The training stage 32 finds an average face image as follows. Let the training set of K acquired face images be represented by the image vectors $\Gamma_1, \Gamma_2, \Gamma_3, \ldots \Gamma_K$. The training stage 32 calculates the average face, $\Psi$, of this reference set according to $$\Psi = (K)^{-1} \Sigma_n \Gamma_n$$

where the summation is from n=1 to K. Each reference image vector differs from the average or mean face by a vector $\Phi_i = \Gamma_i - \Psi$ Reduction stage: The reduction stage 34 employs principal component analysis (PCA) to reduce the dimensionality, $N^2$ (=65,536 in the example of a 256 by 256 pixel image), of the problem to a more manageable dimension M. The PCA identifies principal components that best describe the distribution of face data within the face space. In particular, M meaningful eigenvectors, $u_1 \ldots u_M$, are identified, which can be taken to be orthonormal:

$$u_k^T u_m = \delta_{km} = \begin{cases} 0 \text{ if } k = m \\ 1 \text{ if } k \neq m \end{cases}$$

The vectors $u_k$ are the eigenvectors, with associated eigenvalues $\lambda_k$, of the covariance matrix $$C = (K)^{-1} \sum_n \Phi_n \Phi_n^T$$
$$= AA^T$$

where the matrix A is defined by $A = (\Phi_1 \Phi_2 \ldots \Phi_K) / \sqrt{K}$.

The covariance matrix C is an $N^2 \times N^2$ matrix, and determining the $N^2$ eigenvectors and eigenvalues can become an intractable task for typical image sizes. Fortunately, if $K<N^2$, where K the number of training set members, then it is possible to reduce the amount of computational work because there are at most K meaningful eigenvectors, where a meaningful eigenvector is one that is not associated with a zero eigenvalue. The difference between K and the degeneracy of the zero eigenvalue of the matrix $A^TA$ is equal to M. If $A^TAv=0$ has only the trivial solution, then there are K meaningful eigenvectors, otherwise there are fewer than K meaningful eigenvectors. The reduction stage 34 can solve for the $N^2$ dimensional eigenvectors in this case by first solving for the eigenvectors of the matrix $A^TA$. This last matrix, which is of dimension K×K, can be much smaller than the 65,536 by 65,536 covariance matrix (corresponding to a 256 by 256 image), and thus more manageable.

To wit, consider the eigenvectors $v_i$ of $A^TA$ satisfying:

$$A^TAv_i=\mu_i v_i$$

Premultiplying both sides by A, yields:

$$AA^TAv_i=\mu_i Av_i.$$

Therefore, provided $Av_i \neq 0$, which is generically true, or provided $\mu_i \neq 0$, if $v_i$ is an eigenvector of $A^TA$ and $\mu_i$ is the associated eigenvalue, then $Av_i$ is an eigenvector of $C=AA^T$ and $\mu_i$ is the associated eigenvalue. Note that if $Av_i=0$, then $\mu_i=0$.

Likewise, consider the eigenvectors $u_i$ of $AA^T$ satisfying:

$$AA^T u_i = \lambda_i u_i$$

Premultiplying both sides by $A^T$, yields:

$$A^TAA^T u_i = \lambda_i A^T u_i.$$

Therefore, provided $A^T u_i \neq 0$, or provided $\lambda_i \neq 0$, if $u_i$ is an eigenvector of $AA^T$ and $\lambda_i$ is the associated eigenvalue, then $A^T u_i$ is an eigenvector of $A^TA$ and $\lambda_i$ is the associated eigenvalue. Note that if $A^T u_i=0$, then $\lambda_i=0$.

Accordingly, the reduction stage 34 constructs the K by K matrix $A^TA$, and finds the K eigenvectors, $v_i$, of $A^TA$. These vectors determine linear combinations of the K training set face images to form the M meaningful eigenfaces $u_k$:

$$u_k = \frac{1}{\sqrt{K}} \sum_{j=1}^{K} v_{jk} \Phi_j$$

where $v_{jk}$ is the jth component of the kth eigenvector $v_k$.

The foregoing analysis greatly reduces the calculations necessary to handle the image data, from the order of the number of pixels in the image ($N^2$) to the order of the number of images in the training set (K). In practice, the training set of face images can be relatively small ($K<<N^2$), although larger sets are also useful, and the calculations become quite manageable. The associated eigenvalues provide a basis for ranking or ordering the eigenvectors according to their usefulness in characterizing the variation among the images.

In practice, a smaller number M' of most significant eigenvectors chosen from: the M significant eigenvectors, is sufficient for identification purposes, since complete and accurate reconstruction of the image is generally unnecessary to create a match. Specifically, the eigenfaces span a second vector space of dimension M' that is a subspace of the first vector space of dimension $N^2$. The M' most significant eigenvectors of the $A^TA$ matrix are selected as those with the largest associated eigenvalues, and therefore contain the most useful image information, e.g., contain maximum variance information.

Projection module: The projection module 35 performs a projection operation. In particular, given an arbitrary image vector, $\gamma$, the projection module projects the vector onto the vector space spanned by M' eigenfaces $u_j$ according to $$\gamma \rightarrow P_u \gamma = \sum_{k=1}^{M'} (u_k, \gamma) u_k$$

where $(u_k, \gamma)$ denotes an inner product:

$$(u_k, \gamma) = u_k^T \gamma.$$

Thus, $P_u$ is the projection operator onto the subspace spanned by the M' most significant eigenvectors. The projection module can also compute $[P_u \gamma]_u$, the column vector representation of $P_u \gamma$ in the basis $\{u_1, \ldots, u_{M'}\}$.

As mentioned above, M' is at most M, where M is the dimension of the vector space spanned by the M meaningful vectors, but in practice can be less than M if some of the meaningful eigenvectors associated with small, but non-vanishing eigenvalue, are neglected.

Extractor: The extractor 36 obtains a similarity covariance matrix together with its eigenvectors. These eigenvectors, dubbed similarity eigenvectors, are used to extract information from $\Omega=[P_u(\Gamma-\Psi)]_u$, where $\Gamma$ is an unknown image vector to be identified. This information can then be processed to help identify $\Gamma$.

The extractor 36 uses as input a set of R image vectors, $\{\gamma_1, \gamma_2 \ldots \gamma_R\}$, corresponding to a particular individual. This set of image vectors can correspond to the same individual with different illumination, expression, or pose. Using this set of images, R column vectors can be calculated with the help of the projection module 35, the jth one given by $$\Omega_j = (\Omega_{1j} \Omega_{2j} \ldots \Omega_{M'j})^T$$

where $\Omega_{ij}=(u_i, \gamma_j-\Psi)$. In other words, $\Omega_j=[P_u(\gamma_j-\Psi)]_u$. Using these column vectors, an M'×M' similarity covariance matrix, $C_s$, can be calculated as follows:

$$C_s = \frac{1}{R} \sum_{n=1}^{R} (\Omega_n - \overline{\Omega})(\Omega_n - \overline{\Omega})^T,$$

where the average vector $\overline{\Omega}$ is given by $$\overline{\Omega} = \frac{1}{R} \sum_{j=1}^{R} \Omega_j.$$

Thus, $C_S$ is the covariance matrix associated with covariances of intrapersonal variations of an individual. The extractor 36 can compute $C_S$ for an individual to be identified, or a known individual from the reference database. In the latter case, the extractor can use the set of vectors $$\{\Omega_1^j, \Omega_2^j, \ldots \},$$

pertaining to the particular individual j, to calculate the covariance matrix for individual j.

Two implementations of the present invention can be utilized that pertain to two ways in which the covariance matrices can be used for image recognition. The first implementation is appropriate when many images of the same individual are available. The first implementation utilizes a distinct similarity covariance matrix for each individual to generate a unique projector, $P_s$, for each individual, as described below in more detail. The second implementation may be appropriate when there is an individual to which there corresponds only a few (as little as one) available images. The second implementation utilizes a composite similarity covariance matrix to generate a common projector, $P_{s,comp}$, for all the individuals, as described below in more detail. These implementations are now described in turn.

Implementation I:

The eigenvectors of the similarity covariance vector are $s_1, \ldots, s_{M'}$. These eigenvectors can be obtained by diagonalizing the M'×M' matrix that is $C_s$ directly. Instead, a smaller R×R matrix can be diagonalized by analogy to how the eigenvectors of $AA^T$ were found above by diagonalizing $A^TA$. $P_s$ denotes the projection operator onto the subspace spanned by the significant similarity eigenvectors (i.e., the eigenvectors of $C_s$ not corresponding to the zero eigenvalue, if such an eigenvalue exists):

$$P_s \Omega = \sum_j (s_j, \Omega) s_j$$

In another embodiment, $P_s$ can denote the projection operator onto a subspace spanned by a subset of the significant similarity eigenvectors corresponding to the largest eigenvalues, which are the most significant similarity eigenvectors (the number of most significant similarity eigenvectors can be varied in different embodiments to optimize results).

Given an image vector Γ that is to be identified, the projection module 35 can compute $\Omega=[P_u(\Gamma-\Psi)]_u$. The extractor 36 can then compute $P_s\Omega$, which may be used by the discrimination stage 20, described below, to identify the image vector Γ. Note that in this first implementation, to each individual there corresponds a generally unique projector $P_s$.

Implementation II:

In another implementation, a composite similarity covariance matrix $C_{S,comp}$ is computed before calculating its eigenvectors. In particular, the composite similarity covariance matrix is formed from the sum of similarity covariance matrices of different individuals:

$$C_{s,comp} = \sum_j C_{s,j}$$

Here, $C_{s,j}$ denotes the covariance matrix of a particular individual j. The individual j may be a known individual, from the reference database 18, for example, or an unknown individual. Note that to obtain a non-zero covariance matrix $C_{s,j}$ at least two images of individual j are needed. The extractor 36 can then calculate the eigenvectors of the composite similarity covariance vector, which are denoted by $s_{1,comp}, \ldots s_{M',comp}$. These eigenvectors can be obtained by diagonalizing the M'×M' matrix that is $C_{S,comp}$. The operator $P_{s,comp}$ denotes the projector onto the subspace spanned by the significant similarity eigenvectors of $C_{s,comp}$ (i.e., the eigenvectors of $C_{s,comp}$ not corresponding to the zero eigenvalue, if such an eigenvalue exists). In another embodiment, $P_{s,comp}$ can denote the projection operator onto a subset of the significant similarity eigenvectors corresponding to the largest eigenvalues, which are the most significant similarity eigenvectors (the number of most significant similarity eigenvectors can be varied in different embodiments to optimize results).

Given an image vector Γ that is to be identified, the projection module 35 can compute $\Omega=[P_u(\Gamma-\Psi)]_u$. The extractor 36 can then compute $P_{s,comp}\Omega$, which may be used by the discrimination stage 20, described below, to identify the image vector Γ. Note that in this second implementation, each individual is projected by a common projector $P_{s,comp}$.

Discriminating Stage:

A discrimination stage 20 identifies the individual by finding a match between a representation of the image of the person seeking the security unit, and a reference in the database. This matching process can be performed by taking into account intrapersonal variation. There are two possible implementations that take account of intrapersonal variations, corresponding to Implementations I and II described above. This matching process can also be performed without taking into account intrapersonal variation, as follows.

To identify the person using an image, the discrimination stage inputs $\Omega=[P_u(\Gamma-\Psi)]_u$ from the projection module 35. The discrimination stage 20 then computes the norm $\|\Omega-\Omega_{ref}\|$ for each reference vector $\Omega_{ref}$. If several reference vectors of a single individual are available, then $\Omega_{ref}$ can be taken to be the average of these vectors. A match occurs if the norm $\|\Omega-\Omega_{ref}\|$ is less than some threshold ϵ. If several reference vectors match Ω, then further analysis can occur to find the best match. In one embodiment, for example, the reference vector yielding the smallest norm is used to identify the individual.

Instead of ignoring intrapersonal variations, the discrimination stage 20 can enlist the help of the extractor 36 to account for such variation. Two implementations are possible, which correspond to the two implementations discussed above and which are now detailed in turn.

Implementation I:

To find a match between the individual seeking a security unit and a reference, while accounting for intrapersonal variation, the discrimination stage 20 computes the norm $\|(1-P_s)\Omega-(1-P_s)\Omega_{c1}\|$, where $\Omega_{c1}$ is the column vector that corresponds to a particular class of individuals. For example, the class of individuals may be a single individual j, and may be obtained by averaging J images of the same individual j, $$\Omega_{cl=j} = J^{-1} \sum_{m=1}^{J} \Omega_m^j.$$

The number J may be as small as one. If this norm is less than some threshold ϵ, i.e. if $$\|(1-P_s)\Omega-(1-P_s)\Omega_{c1}\| < \epsilon,$$

then the individual has been identified as belonging to the same class that $\Omega_{c1}$ represents.

Note that $P_S$ is not generally a linear operator because firstly the domain of the operator $P_S$ need not be a vector space. Instead, the domain of the operator $P_S$ can be the union of the set of all class vectors, $\Omega_{c1}$, associated with the reference database 18, and the set of unidentified vectors, a member of which has been denoted by Ω. Secondly, it is not generally true that the image of a sum of vectors is the sum of the images. For example, note that the set of all class vectors may not be independent. Therefore, one class vector, say $\Omega_{c1,3}$, may be equal to the sum of two other class vectors, $\Omega_{c1,3}=\Omega_{c1,1}+\Omega_{c1,2}$. In general, $P_S\Omega_{c1,3} \neq P_S\Omega_{c1,1} + P_S\Omega_{c1,2}$ since $P_S\Omega_{c1,3}$ is a projection onto a subspace spanned by eigenvectors of the similarity covariance matrix obtained from variations in the image $\Omega_{c1,3}$, whereas $P_S\Omega_{c1,1}$ is a projection onto a different subspace spanned by eigenvectors of the similarity covariance matrix obtained from variations in the image $\Omega_{c1,1}$.

In another embodiment, the vectors $(1-P_s)\Omega$ and $(1-P_s)\Omega_{c1}$ can first be normalized. Thus, if $$\left\| \frac{(1-P_s)\Omega}{\|(1-P_s)\Omega\|} - \frac{(1-P_s)\Omega_{cl}}{\|(1-P_s)\Omega_{cl}\|} \right\| < \theta_2,$$

the individual has been identified as belonging to the same class that $\Omega_{c1}$ represents.

Implementation II:

The discrimination stage 20 computes the norm $\|(1-P_{s,comp})(\Omega-\Omega_{c1})\|$, where $\Omega_{c1}$ is the column vector that corresponds to a particular class of individuals. For example, the class of individuals may be a single individual, and may be obtained by averaging images of the same individual, or by using a single image of an individual. If this norm is less than some threshold $\epsilon$, i.e., if $$\|(1-P_{s,comp})(\Omega-\Omega_{c1})\| < \epsilon$$

then the individual has been identified as belonging to the same class that $\Omega_{c1}$ represents. This last inequality can also be written as $\|(1-P_{s,comp})[P_u(\Gamma-\Gamma_{c1})]_u\| < \epsilon$ since $$\Omega - \Omega_{cl} = [P_u(\Gamma - \Psi)]_u - [P_u(\Gamma_{cl} - \Psi)]_u$$

$$= [P_u(\Gamma - \Gamma_{cl})]_u.$$

In another embodiment, the vectors $(1-P_{s,comp})\Omega$ and $(1-P_{s,comp})\Omega_{c1}$ can first be normalized. Thus, if $$\left\| \frac{(1-P_{s,comp})\Omega}{\|(1-P_{s,comp})\Omega\|} - \frac{(1-P_{s,comp})\Omega_{cl}}{\|(1-P_{s,comp})\Omega_{cl}\|} \right\| < \varepsilon,$$

the individual has been identified as belonging to the same class that $\Omega_{c1}$ represents.

Regardless of the implementation, the above description involves associating an image of an object with the vector $\Gamma-\Psi$, projecting that vector using principal component analysis to yield $\Omega$, and then projecting $\Omega$ using $(1-P_s)$ or $(1-P_{s,comp})$ to account for intrapersonal variation. Those of ordinary skill in the art will recognize that the middle step using principal component analysis can, in one embodiment of the present invention, be omitted. In such case, $P_s$, for example, would project onto the subspace spanned by eigenvectors of the covariance matrix $$R^{-1} \sum_{j=1}^{R} \gamma_j \gamma_j^T.$$

A function of the projected vector $(1-P_s)(\Gamma-\Psi)$ or the projected vector $(1-P_{s,comp})(\Gamma-\Psi)$ can then be evaluated to match the image to the database. The function, for example, can involve a norm to determine a match with a reference vector analogous to the method described above.

Figure 5:
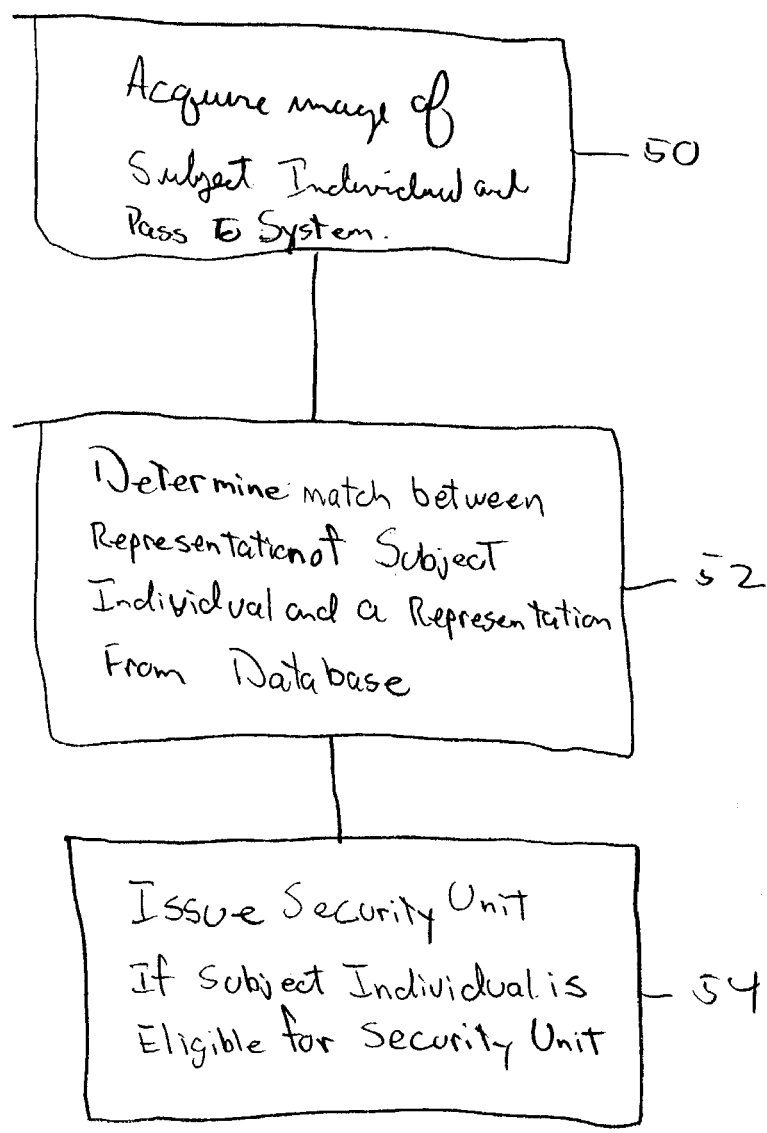
FIG. 5 shows a flowchart for issuing a security unit to an individual, according to the teachings of the present invention.

Referring to FIG. 5, a flowchart showing steps for issuing a security unit to an individual, after determining the eligibility of the individual, is shown. In step 50, an image of the individual is provided to the security system 100. The image can be acquired from an image acquisition device 10, which may or may not be part of the system 100. While reference has been made to images whose pixels are associated with intensities of light, other images whose pixels correspond to different optical properties can be used. In step 52, a match is found between a representation of the image and a reference in a database, the reference being associated with a reference individual. The matching process can be performed using a myriad of recognition methods. For example, PCA has been described above as a method for image recognition, but other recognition methods can also be used. Subsequently, in step 54, a security unit is issued to the individual provided the reference individual is eligible to receive the security unit. Criteria that can determine eligibility include whether the individual has been flagged as someone who is prohibited by law from obtaining the security unit, whether the individual is using an alias as a name, and whether the individual has already been issued a unit.

Those skilled in the art will recognize, or be able to ascertain using no more than routine experimentation, many equivalents to the specific embodiments and methods described herein. For example, although reference has been made to recognizing faces, those of ordinary skill in the art will appreciate that the aforementioned techniques can be applied to distinguish various other anatomical features, such as eyes, ears, and teeth. In addition, someone of ordinary skill in the art will appreciate that a hybrid of the two implementations described above for accounting for intrapersonal variation can be used. In particular, a hybrid can be used where for some individuals, their own projectors are utilized to account for intrapersonal variation, whereas for other individuals a composite projector is utilized. Such equivalents are intended to be encompassed by the scope of the following claims.

What is claimed is:

1. A method for issuing a security unit to an individual after determining eligibility by image recognition, the method comprising
   providing an image of the individual;
   finding a match between a representation of the image and a reference in a database associated with a reference individual by performing the steps of:
   associating the image with a first vector;
   projecting the first vector to form a second vector; and
   evaluating a function of the second vector to match the image to the reference in the database; and
   issuing a security unit to the individual provided the individual is eligible to receive said security unit.

2. The method of claim 1, further comprising, before the step of providing, acquiring the image of the individual with an image acquisition device.

3. The method of claim 1, further comprising providing a name of the individual.

4. The method of claim 1, wherein the security unit includes at least one of a key, a card, and a photo ID.

5. The method of claim 3, wherein the step of issuing includes the steps of:
   determining whether the name of the individual does not match a name of the reference individual;
   determining whether the individual has previously received a previous security unit; and
   determining whether the reference individual is not allowed to receive the security unit, wherein an affirmative determination to any of the three determining steps deems the individual ineligible to receive said security unit and said security unit is not issued.

6. The method of claim 1, wherein the first vector is substantially equal to $\Gamma-\Psi$, where $\Gamma$ has components corresponding to intensities at pixels in the image, and $\Psi$ is an average vector of a training set of vectors.

7. The method of claim 6, wherein the step of projecting the first vector to form a second vector, $\Omega$, includes calculating a covariance matrix utilizing the training set of vectors and $\Psi$;

finding a set of eigenvectors associated with non-zero eigenvalues of the covariance matrix; and forming the second vector by projecting the first vector onto a vector space spanned by the set of eigenvectors, the second vector being a vector representation, with respect to the set of eigenvectors, of the projection of the first vector, $\Omega=[P_u(\Gamma-\Psi)]_u$.

8. The method of claim 1, wherein the step of finding a match includes associating the image with a first vector;

projecting the first vector to form a second vector;

to account for intra-object variation in the image, forming a third vector from the second vector and at least one of a first plurality of vectors representing the individual and a second plurality of vectors representing the reference individual; and evaluating a function of the third vector to match the image to the reference in the database.

9. The method of claim 8, wherein the first vector is substantially equal to $\Gamma-\Psi$, where $\Gamma$ has components corresponding to intensities at pixels in the image, and $\Psi$ is an average vector of a training set of vectors.

10. The method of claim 9, wherein the step of projecting the first vector to form a second vector, $\Omega$, includes calculating a covariance matrix utilizing the training set of vectors and $\Psi$;

finding a set of eigenvectors associated with non-zero eigenvalues of the covariance matrix; and forming the second vector by projecting the first vector onto a vector space spanned by the set of eigenvectors, the second vector being a vector representation, with respect to the set of eigenvectors, of the projection of the first vector, $\Omega=[P_u(\Gamma-\Psi)]_u$.

11. The method of claim 10, wherein the step of forming a third vector includes calculating a second covariance matrix utilizing the first plurality of vectors; and finding a second set of eigenvectors associated with non-zero eigenvalues of the second covariance matrix.

12. A system for issuing a security unit to an individual after determining eligibility by image recognition, the system comprising a recognition system for finding a match between a representation of an image of the individual and a reference in a database associated with a reference individual, the recognition system including, an image data preprocessor for associating an image of the individual with a first vector;

a projection module for projecting the first vector to form a second vector; and a discrimination stage for evaluating a function of the second vector to match the representation of the image to the reference in the database; and an issuing module for issuing a security unit to the individual provided the individual is eligible to receive said security unit.

13. The system of claim 12, further comprising an image acquisition device for acquiring the image of the individual.

14. The system of claim 12, wherein the issuing module is provided with a name of the individual, and the issuing module includes a determination module for determining whether the name of the individual does not match a name of the reference individual;

the individual has previously received a previous security unit; and the reference individual is not allowed to receive the security unit, wherein the system determines the individual is ineligible to receive the security unit if any of the three previous determinations are affirmative and the security unit is not issued to the individual.

15. The system of claim 12, wherein the security unit includes at least one of a key, a card, and a photo ID.

16. The system of claim 12, wherein the first vector is substantially equal to $\Gamma-\Psi$, where $\Gamma$ has components corresponding to intensities at pixels in the image, and $\Psi$ is an average vector of a training set of vectors.

17. The system of claim 16, wherein the projection module calculates a covariance matrix utilizing the training set of vectors and $\Psi$;

finds a set of eigenvectors associated with non-zero eigenvalues of the covariance matrix; and forms the second vector by projecting the first vector onto a vector space spanned by the set of eigenvectors, the second vector being a vector representation, with respect to the set of eigenvectors, of the projection of the first vector, $\Omega=[P_u(\Gamma-\Psi)]_u$.

18. The system of claim 12, wherein the recognition system includes an image data preprocessor for associating the image of the individual with a first vector;

a projection module for projecting the first vector to form a second vector;

to account for intrapersonal variation in the image, an extractor for forming a third vector from the second vector and at least one of a first plurality of vectors representing the individual and a second plurality of vectors representing the reference individual; and a discrimination stage for evaluating a function of the third vector to match the representation of the image to the reference in the database.

19. The system of claim 18, wherein the first vector is substantially equal to $\Gamma-\Psi$, where $\Gamma$ has components corresponding to intensities at pixels in the image, and $\Psi$ is an average vector of a training set of vectors.

20. The system of claim 19, wherein the projection module calculates a covariance matrix utilizing the training set of vectors and $\Psi$;

finds a set of eigenvectors associated with non-zero eigenvalues of the covariance matrix; and forms the second vector by projecting the first vector onto a vector space spanned by the set of eigenvectors, the second vector being a vector representation, with respect to the set of eigenvectors, of the projection of the first vector, $\Omega=[P_u(\Gamma-\Psi)]_u$.

21. The system of claim 18, wherein the extractor calculates a second covariance matrix utilizing the first plurality of vectors; and finds a second set of eigenvectors associated with non-zero eigenvalues of the second covariance matrix.

* * * * *